UNITED STATES PATENT OFFICE.

EDWARD SONSTADT, OF CHESHUNT, COUNTY OF HERTFORD, ENGLAND.

MEDICAL COMPOUND.

SPECIFICATION forming part of Letters Patent No. 345,867, dated July 20, 1886.

Application filed May 14, 1886. Serial No. 129,293. (No specimens.) Patented in England October 16, 1883, No. 4,920.

*To all whom it may concern:*

Be it known that I, EDWARD SONSTADT, a subject of the Queen of Great Britain, residing at Cheshunt, in the county of Hertford, England, have invented an improved preparation for the destruction of disease-bacteria or microzymes in man or beast, (for which I have obtained a patent in Great Britain, No. 4,920, bearing date October 16, 1883,) of which the following is a specification.

The essential features of my invention consist, first, in preventing liability to the formation of mold in a solution containing calcium iodate by addition thereto of a salt of salicylic acid, preferably sodium or potassium salicylate; second, in increasing the solubility of calcium iodate by mixture thereof with sodium or potassium citrate by adding calcium iodate to a solution of sodium or potassium citrate as long as it dissolves, or by adding successively and repeatedly calcium iodate and the citrate to water until a solution is obtained, either saturated or approaching as near to saturation as may be desired; and, third, in combining the features of the first and second parts of my invention by aiding the solution of the calcium iodate by the addition of an alkali metal citrate, as described, and dissolving in such solution some sodium or potassium salicylate, thus obtaining a mold-proof and relatively strong solution.

Calcium iodate acts by killing the minute organisms or microzymes capable of inducing putrefactive changes with which it may be brought in contact. My recent experiments indicate that calcium iodate, although non-poisonous to man or beast, is as effective in destroying disease-bacteria or bacilli as my older researches proved it to be in killing putrefactive microzymes.

For the destruction of disease-bacilli or microzymes in the organs of respiration a solution is made of calcium iodate, to which sodium or potassium salicylate is added, as under the first head of the invention, to which solution chinoline tartrate, and sometimes glycerine, may with advantage be added, and air charged with the spray of such solution is inhaled by the patient. An ordinary "spray-producer" may be employed, or the solution may be placed in an "inhaler" furnished with inlet-tube passing below the surface of the liquid, and outlet-tube, through which air is drawn.

Cattle suffering from pleuro-pneumonia, or other disease of the respiratory organs, may be caused to breathe air charged with spray of the solution in any convenient way, or the breathing may be caused to take place through a fibrous screen or cloth kept moistened with the solution, or the nostrils may be sponged with the same. In severe cases it may be advisable to use the above solution increased in strength by the addition of a further dose of calcium iodate brought into solution by the introduction of alkali metal citrate, as previously described.

In preparing the inhaler for use, I add about one part of calcium iodate to each one hundred parts of water, being in considerable excess of the quantity capable of being dissolved, as I prefer that some undissolved iodate should always be present ready to enter into solution in case of reduction (by access of fetid organic matter) of any of the iodate already in solution. Of chinoline tartrate I prefer to add about one-fourth of the weight of the calcium iodate employed. For example, to charge an inhaler of about one hundred cubic centimeters internal capacity, I would take thirty cubic centimeters water, 0.3 grams calcium iodate, 0.075 grams chinoline tartrate, and about five drops of solution of sodium (or potassium) salicylate, containing about twenty per cent. of that salt or its equivalent in a stronger or weaker solution. Glycerine may be added in any proportion, though, as it tends to diminish the solubility of the iodate, I prefer to use it only when there is great irritability of the lungs, or when the matter expectorated by the patient is ensanguined, and then best effects are obtained on adding glycerine equal to about one-half the bulk of the original solution. When it is desired to produce a strong solution of calcium iodate in the inhaler, the quantity of calcium iodate added to, say, thirty cubic centimeters of water may be somewhat over 1.2 grams, with addition of 4.8 grams of potassium (or sodium) citrate, the neutral salt dried at 100° centigrade being intended thus in the proportion of one to four.

In the treatment of sores, ulcers, cutaneous eruptions, bites of rabid animals, or external wounds of any kind, I prefer to employ one or the other of the stronger solutions described under the second and third heads of the invention.

In cases of Asiatic cholera, typhoid fever, and other diseases in which the alimentary canal is charged with disease-bacteria, injections may be used of either the weaker or the stronger solution described, or calcium iodate conjoined with sodium salicylate, and with or without a citrate and chinoline salt, may be administered internally, made up as pills or lozenges, or in draughts or other convenient form. In such cases the proportions of the dry substances used may be as indicated in the case of preparing a solution for use in the inhaler, especially preserving the relation between calcium iodate and the neutral citrate of one to four parts by weight, already indicated.

Throughout this specification a "solution" is meant to be understood as an aqueous solution.

Having fully described my invention what I desire to claim and secure by Letters Patent is—

1. The mold-proof solution of calcium iodate herein described, consisting of calcium iodate, water, and sodium or potassium salicylate, in or about the proportions substantially as set forth.

2. The herein-described method of increasing the strength of a solution of calcium iodate, consisting in the addition thereto of sodium or potassium citrate in about the proportion of four parts of neutral sodium or potassium citrate dried at 100° centigrade to one part of the iodate, substantially as set forth.

3. The preparation of a strong and mold-proof solution of calcium iodate by the addition thereto of the salicylate and of the citrate, respectively, the additional strength and mold prevention being thus accomplished in the same solution.

4. Dry preparations containing calcium iodate and potassium or sodium salicylate, or calcium iodate and neutral or sodium citrate, or these salts combined, these preparations being used as internal medicine and as external applications, the numerical relations before given between the iodate and the salicylate and between the iodate and the citrate being observed.

5. The solution herein described, consisting of the following ingredients in or about the proportions named, viz: water, thirty cubic centimeters; calcium iodate, 0.3 grams; chinoline tartrate, 0.075 grams, and sodium or potassium salicylate five drops of twenty per cent. solution, substantially as and for the purpose set forth.

6. The solution herein described, consisting of the following ingredients in or about the proportions named, viz: water, thirty cubic centimeters; calcium iodate, 0.3 grams; chinoline tartrate, 0.075 grams, and sodium or potassium salicylate, five drops of twenty per cent. solution, and glycerine of about one-half the bulk of the solution, substantially as and for the purpose set forth.

EDWARD SONSTADT.

Witnesses:
GEORGE HURLSTONE HARDY,
JOHN DEAN.